Nov. 5, 1940.  E. W. CARROLL  2,220,511
CONTINUOUS FRUIT ORIENTATING DEVICE
Filed Sept. 12, 1939  3 Sheets-Sheet 3
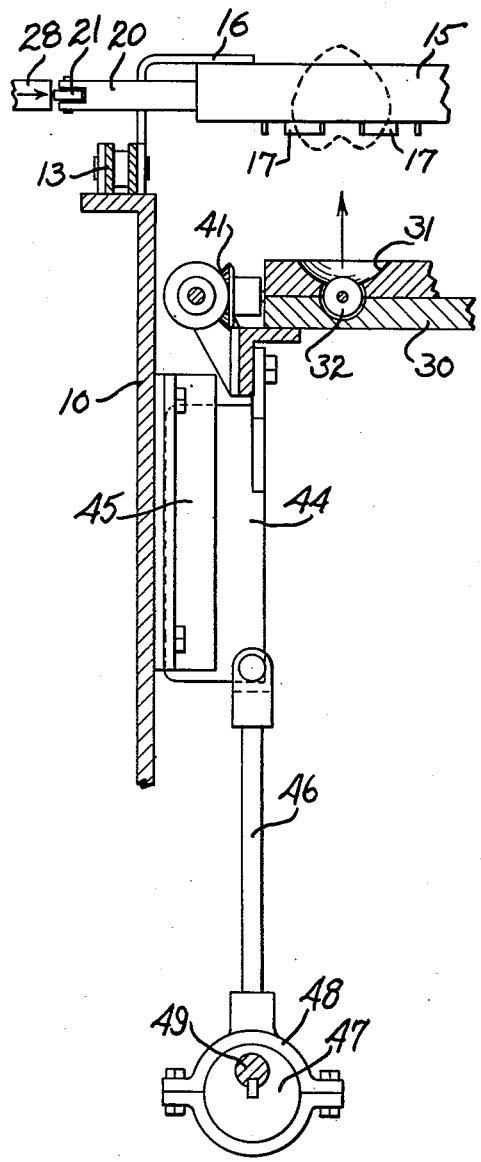
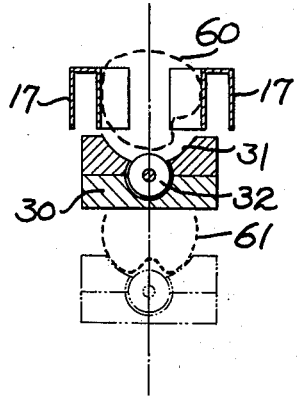
INVENTOR.
ELLSWORTH W. CARROLL.
BY
Lippincott & Metcalf
ATTORNEYS.

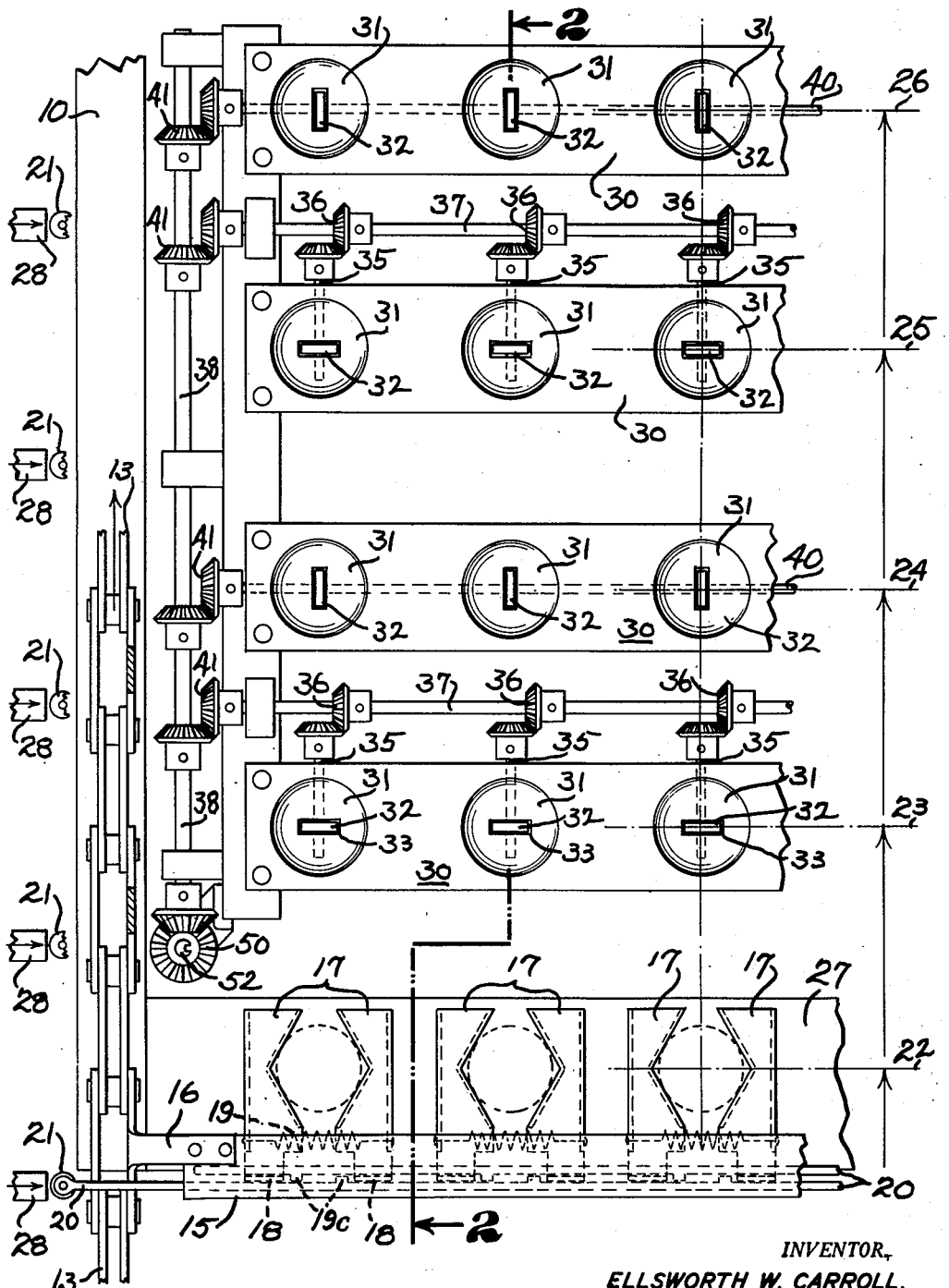

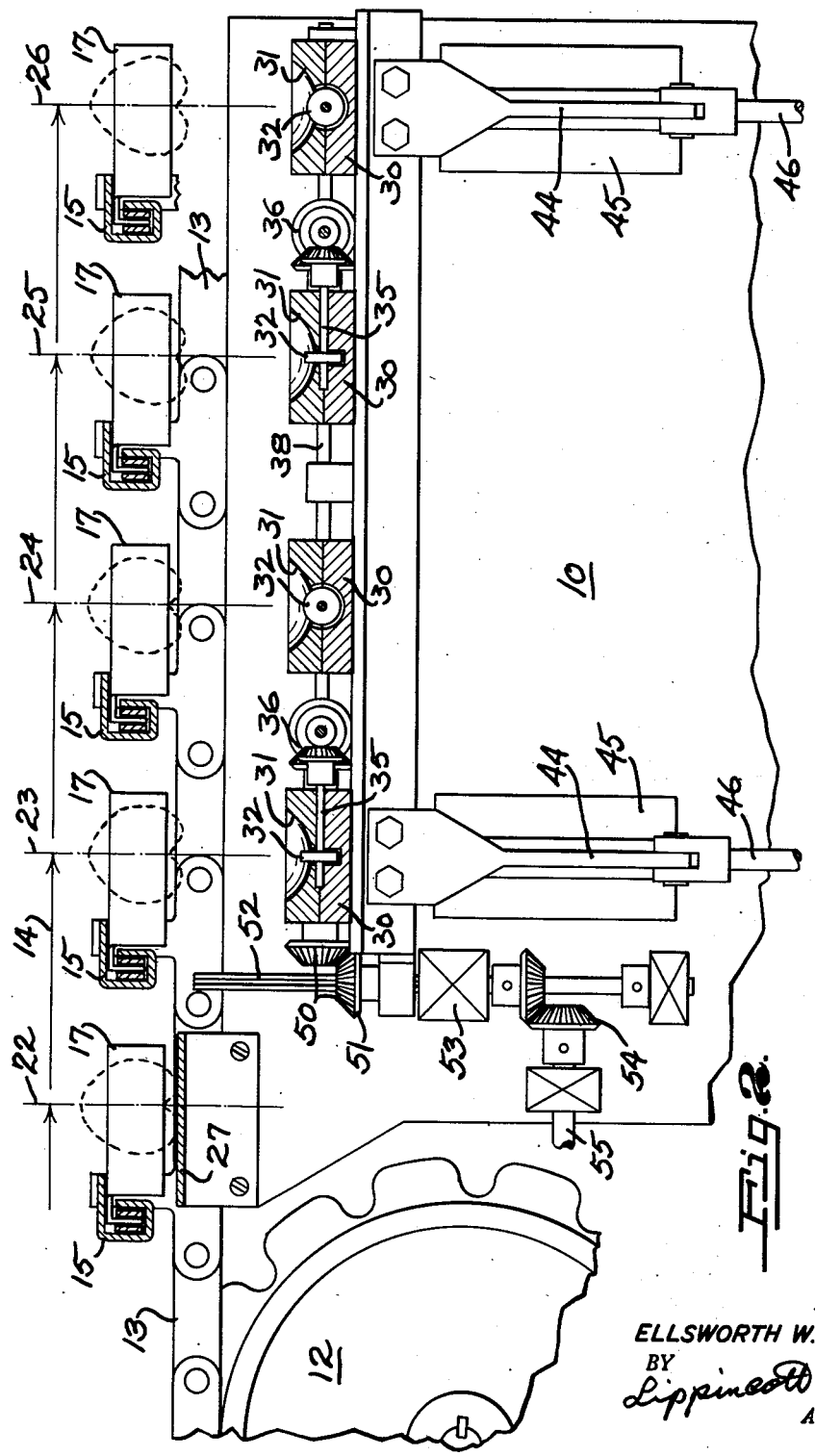

Patented Nov. 5, 1940

2,220,511

UNITED STATES PATENT OFFICE 2,220,511

CONTINUOUS FRUIT ORIENTATING DEVICE

Ellsworth W. Carroll, San Francisco, Calif., assignor to S & W Fine Foods, Inc., San Francisco, Calif., a corporation of California Application September 12, 1939, Serial No. 294,453

30 Claims. (Cl. 198—33)

My invention relates to fruit orientation devices, and more particularly to a means for continuously and automatically orientating fruit having a stem indent, to the end that the fruit be delivered for further processing with the stem indent in a predetermined position. My invention is particularly applicable to the orientation of cherries, so that they may be pitted along the axis of the fruit passing through both the pit and the stem indent.

Among the objects of my invention are: To provide a fully automatic, high speed orientator for indented fruits; to provide a machine to which fruits having stem indents can be supplied in heterogeneous positions, the machine continuously operating on the fruits to deliver them with the stem indents all in one predetermined position; to provide a continuous and automatic cherry orientator; to provide a means of positively orientating fruit having a stem indent; to provide a means for automatically turning fruit into a predetermined position with relation to the stem indent thereof; and to provide a means for orientating fruit prior to a pitting or similar operation.

Other objects of my invention will be apparent or will be specifically pointed out in the description forming a part of this specification, but I do not limit myself to the embodiment of the invention herein described, as various forms may be adopted within the scope of the claims.

In the drawings:

Fig. 1 is a top plan view of a portion of a machine embodying my invention.

Fig. 2 is a side view partly in elevation and partly in section of the machine shown in Fig. 1.

Fig. 3 is a fragmentary view partly in section and partly in elevation, showing the orientation table mechanism.

Fig. 4 is a diagrammatic view showing how a fruit, such as a cherry, is orientated.

Many fruits, such as a cherry, which is here being taken as a typical example of the class, have a more or less spherical contour except for the region of the stem indent, where the contour changes from a convex to a concave curvature. Broadly, my invention utilizes this change in curvature so that the cherry is positively rotated at all times except when the concave portion of the fruit surface registers with the rotating means. The present invention is an adaptation for orientating cherries of the orientating cups described and claimed in my prior application for United States Letters Patent entitled "Full automatic orientator," Serial No. 211,140, filed June 1, 1938, of which the present application is a continuation-in-part. The machine herein to be described and claimed is a full automatic multistage cherry machine capable of high output, the details of which can be better understood by direct reference to the drawings.

In the drawings, a main frame 10 supports a pair of toothed driving wheels 12 at each end thereof, one such wheel being shown in Fig. 2. Parallel endless chains 13 are mounted to be driven by driving wheels 12 over a horizontal path as indicated by arrows 14, and the motion of wheels 12 and chains 13 is caused to be intermittent by the use of the customary Geneva drive, not here shown as it is familiar to all those skilled in the art.

The parallel chains are joined by hollow clamp bars 15 riveted to spaced chain brackets 16. A plurality of bars 15 are used, spaced along the chains a distance equal to the forward motion of the chains 13 between stops. Thus all bars stop in positions previously occupied by preceding bars. Each bar carries a plurality of fruit clamps, each comprising opposed vertical clamp arms 17 having end lugs 18 passing through a slit in the advancing surface of the hollow bars 15 and forced together by a clamp spring 19. Clamp arms 17 are opened by the action of a plurality of dogs 19c mounted on arm control rods 20 sliding within clamp bars 15. Control rods 20 terminate over each chain in a cam roller 21, so that when the control rods 20 are positively forced inwardly the clamp arms are opened against the urge of springs 19, springs 19 closing the arms and moving the rods outwardly when the positive force is removed.

The movement of chains 13 is so coordinated with the spacing of the bars that the vertical axes of the clamps will stop during the passage thereof across the plane of movement at at least six stations, as indicated by vertical broken lines in Figs. 1 and 2, the first station being a loading station 22 and the next four stations being orientating stations 23, 24, 25 and 26. These five stations finish the orientation of the fruit, and the following stations may be inspection and pitting stations or any other station where an additional operation may be performed upon the orientated fruit.

The clamps at loading station 22 are stopped over a fruit support 27 extending horizontally beneath the clamp, and in this position the control rods 20 are operated upon by a rod cam 28 so that the clamps are opened. Cherries may then be loaded into the space between the clamp arms, either by hand or directly from a hopper. Cam 28 is then operated to release the control rods, thereby releasing the clamp arms and causing them to grip the fruit by reason of the clamp springs 19. The wheels 12 then rotate to advance the loaded line of clamps to the first orientation stage 23.

Directly beneath the following clamp stops, indicated by lines 23, 24, 25 and 26, are positioned connected orientation table bars 30 lying in a horizontal plane, each bar carrying a plurality of orientation cups 31 spaced so that each clamp, when stopped, has a cup directly below it, but far enough below so that the cups will not interfere with the progression of the clamps with the fruit contained therein. The cups in the first orientation stage each have, at the bottom of their concavity, an orientating wheel 32 entering the concavity through a slot 33 and projecting into the cavity by an amount which will vary in accordance with the type of cherry to be orientated, as will be explained later. The wheels in the first orientation stage are preferably positioned to rotate in a plane at right angles to the line of progression of the clamps.

Directly beneath the clamps in the second orientation station 24 is positioned a second series of cups 31 with wheels 32 projecting thereinto exactly as in the first orientation stage, with the exception that the wheels rotate, in the second stage, in a plane at right angles to the plane of rotation of the wheels in the first stage. Beneath the clamps in the third stage 25 is a third series of cups 31 and wheels 32, with the wheels rotating, in this case, in a plane parallel to the wheels in the first stage 23, and fourth orientation stage 26 has positioned beneath the clamps at this point a fourth series of cups 31 and wheels 32, these latter wheels rotating in a plane parallel to and in alinement with the wheels in second stage 24. Thus, in alternate stages the wheels rotate in different planes.

Rotation of the wheels is accomplished in stages 23 and 25 by the use of short shafts 35 driven by bevel gears 36 attached to cross-shaft 37 which in turn is driven by longitudinal shaft 38, whereas the wheels in the second and fourth orientation stages 24 and 26 respectively, are all mounted on a single wheel shaft 40 driven directly from longitudinal shaft 38 through single bevel gears 41.

Inasmuch as I prefer to move the entire assembly of orientation cups and wheels in a vertical reciprocating path, connected table bars 30 are mounted on vertical arms 44 sliding in vertical bearings 45, these vertical bearings being attached to main frame 10. Reciprocation of the orientation cup assembly is accomplished through the medium of connecting rod 46 driven by an eccentric 47 through a bearing 48, as shown in Fig. 3. Eccentric shaft 49 is driven in any convenient manner in synchronism with the movement of the clamps.

In order, however, that the orientation wheels 32 may be rotated at any point along the reciprocating path of the cup assembly, the longitudinal shaft terminates in a main drive gear 50 meshing with second main bevel gears 51 mounted on first table bar 30, the horizontal portion of gears 51 having a central splined shaft 52 which is stationary and held vertically in stationary bearing 53 attached to frame 10. Splined shaft 52 is driven from the main power source by power gears 54 from shaft 55, in any convenient manner.

As each line of clamps stops in the various station positions, opening rod cam rollers 21 become alined with individual rod cams 28, all of which may be operated simultaneously to open all the clamps after they have stopped and to close them again just before they start to move again. The synchronization of the motion of the cup assembly with the motion of the clamps is made such that when the clamp arms open in stages 23 to 26 inclusive, a cup will be directly beneath each clamp and thus will receive a fruit as the clamps open. The cup assembly then drops while the fruit is being rotated by the wheels, as will be described later, and then rises again to position the fruit between the clamp arms as the clamp arms reclose.

Thus, the broad sequence of operation, following a single clamp through the machine, is that the clamp will open in the loading station 22, will receive a fruit, and will carry that fruit to station 23, there to deposit it in a cup at the first orientation stage 23 to expose the fruit to the rotating action of wheel 32 in the cup. After a stroke of the cups the fruit will then be reclamped and conveyed to station 24, deposited in the cup, rotated by the wheel, and returned to be reclamped, and again transported to stations 25 and 26 where the rotating sequence is repeated. In the course of this transportation the fruit becomes orientated, and the manner by which the fruit becomes orientated may be more fully understood by reference to Fig. 4.

In Fig. 4, in the upper solid line position, the cherry, indicated by dotted line 16, is held firmly between clamp arms 17 until cup 31 is directly beneath the clamp, whereupon arms 17 open outwardly and the fruit thereupon is dropped into and is carried solely by cup 31, normally resting against one edge of the cup and the bottom wheel 32. During the time, however, that the cup is being lowered and returned to the upper position, the fruit may be rotated in the cup by the friction contact of wheel 32 with the fruit surface. If, however, in the particular plane of rotation being traversed by the fruit, the stem indent registers with wheel 32, the wheel 32 no longer contacts the cherry, and the cherry settles into a firm, staple position in the cup, as indicated by dotted lines 61 in the lower position of Fig. 4. Wheel 32 keeps on rotating but cannot rotate the cherry because of the fact that it cannot make contact with the fruit. Thus, in this case the fruit is returned to the clamp and is regripped by arms 17, with the stem indent down, and is then passed along to the next orientation position.

Assuming that a cherry being rotated in first orientation stage 23 keeps on rotating during the stay in the cup because the wheel 32 does not register with the stem indent, the fruit will then be returned to the clamp in an unorientated position. Consequently, when it is passed along to the second orientation stage 24 the fruit will again be rotated, but this time in a plane at right angles to the plane in which it was being rotated by the wheel 32 in the first stage 23. The probability of the stem indent registering with the wheel in this second stage greatly increases because of the change in plane of rotation. If, however, no registration of wheel and indent takes place and no orientation is accomplished in station 24, the cherry is returned to the clamp and passed to the third stage 25, which is similar in construction to Fig. 1, and in which the wheel rotates in the same plane as Fig. 1. However, it is highly improbable that the cherry in this third stage 25 will rotate in a plane the same as it rotated in the first stage, because of the fact that the cherries are not exactly spherical. This irregularity of contour will invariably change the plane of fruit rotation even though the plane of wheel rotation is the same. If the cherry is not rotated by the third stage 25 it is then passed to the fourth stage for a final attempt, and I have found that there is only an exceedingly small percentage of cherries which can pass through the four stages without becoming properly orientated.

While I have followed the unorientated cherries through the orientation stages until orientated, it is possible, and indeed quite likely, that the cherries will become orientated in the first of the orientation stages, or indeed it is possible that the cherries may even reach the first stage in properly orientated position. If this is the case then the cherry is simply deposited in the cup in the proper position and therefore is not rotated at all in any of the following stages. If it becomes orientated in the second or third stages then it is passed through the remaining stages without further orientation.

I have found that four stages creating different planes of rotation in alternate stages will give, due to the irregularities of the cherries, practically a one hundred per cent scansion of the cherry surface, so that in one of the four stages the rotating wheels are bound to register with the stem indents of the cherries.

Additional stages or stops of the machine, which are no part of the present invention, may then have structure to operate on the cherry in its properly orientated position, inasmuch as the clamps in the final stage 26 of the orientator pass the cherry along to any following stages in the exact, proper, orientated position.

Thus, I have accomplished by the use of a plurality of alined and identical clamps, cups and wheels, a high output production of the device, and by the use of a multiplicity of orientation stages serially entered by the fruit, I am able to obtain an extremely high efficiency of orientation; as a matter of fact, with properly graded cherries the orientation is one hundred per cent.

It will be obvious to those skilled in the art that the best results will be obtained when cherries of a more or less uniform grade are utilized, because in this case the orientating wheels can be made to project within the cups an amount which will cause them to disconnect from the cherry surfaces having small indents, barring, of course, the malformed cherries. If heavier fruit is to be orientated, such as peaches, for example, such fruit will have a larger indent and therefore my invention can utilize larger wheels, and greater driving power will be obtained. Thus, in order to handle fruits with different sized indents, only the wheels or projection of the wheels into the cups need be changed. Furthermore, while I have shown wheels using smooth driving surfaces, it will be obvious to those skilled in the art that knurled surfaces may be utilized if it is found necessary that the driving force be increased.

My invention is therefore applicable to all types of fruit having stem indents, and particularly to cherries which have been brined, cherries in syrup, or fresh cherries.

I claim:

1. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, means operating to rotate a fruit when released by said clamps, and means for placing a fruit after rotation in position to be held by said clamps.

2. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, fruit receiving cups positioned beneath at least two clamps at successive stops of said conveyor members, said cups being vertically and simultaneously movable in synchronism with said conveyor members, from a point immediately below said arms to receive fruit released by said arms when said arms open, to a point sufficiently below said arms to allow free rotation of the fruit in said cups, and movable back to said first point again, enabling said arms to grasp the rotated fruit when said arms close, and means to rotate said fruit while in said cups.

3. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, fruit receiving cups positioned beneath at least two clamps at successive stops of said conveyor members, said cups being vertically and simultaneously movable in synchronism with said conveyor members, from a point immediately below said arms to receive fruit released by said arms when said arms open, to a point sufficiently below said arms to allow free rotation of the fruit in said cups, and movable back to said first point again, enabling said arms to grasp the rotated fruit when said arms close, said rotating means being positioned to rotate said fruit in different planes in two adjacent cups.

4. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, fruit receiving cups positioned beneath at least two clamps at successive stops of said conveyor members, said cups being vertically and simultaneously movable in synchronism with said conveyor members, from a point immediately below said arms to receive fruit released by said arms when said arms open, to a point sufficiently below said arms to allow free rotation of the fruit in said cups, and movable back to said first point again, enabling said arms to grasp the rotated fruit when said arms close, a wheel entering the bottom of each cup in a different plane in adjacent cups, said wheels rotating said fruit by friction except when the fruit indents register therewith, and means for simultaneously rotating said wheels.

5. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, fruit receiving receptacles vertically movable with relation to said clamps beneath at least two clamps at successive stops of said conveyor members in timely relation to the opening of said clamps, means for rotating said fruit in said receptacles free from said clamps, and means for placing a fruit after rotation in position to be held by said clamps.

6. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, fruit receiving receptacles vertically movable with relation to said clamps beneath at least two clamps at successive stops of said conveyor members in timely relation to the opening of said clamps, means for rotating said fruit in said receptacles free from said clamps, and means for placing a fruit after rotation in position to be held by said clamps, said rotating means also acting to automatically stop rotation of said fruit when said stem indent reaches a predetermined position in said receptacles.

7. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, fruit receiving receptacles vertically movable with relation to said clamps beneath at least two clamps at successive stops of said conveyor members in timely relation to the opening of said clamps, wheels projecting into said receptacles and rotatable in different planes in adjacent receptacles, said wheels projecting only an amount sufficient to rotate said fruit when the convex surface of said fruit is presented to said wheels, and means for placing a fruit after rotation in position to be held by said clamps.

8. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, fruit receiving receptacles vertically movable with relation to said clamps beneath at least two clamps at successive stops of said conveyor members in timely relation to the opening of said clamps, wheels projecting into said receptacles and rotatable in different planes in adjacent receptacles, said wheels projecting only an amount sufficient to rotate said fruit when the convex surface of said fruit is presented to said wheels, and means for simultaneously rotating said wheels, and means for placing a fruit after rotation in position to be held by said clamps.

9. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, fruit receiving receptacles vertically movable with relation to said clamps beneath at least two clamps at successive stops of said conveyor members in timely relation to the opening of said clamps, means operating during the time the clamps are open for simultaneously moving said receptacles from a point immediately beneath said clamps to a lower position and back to the original position, wheels projecting into said receptacles and rotatable in different planes in adjacent receptacles, said wheels projecting only an amount sufficient to rotate said fruit when the convex surface of said fruit is presented to said wheels, and means for simultaneously rotating said wheels.

10. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, fruit receiving receptacles vertically movable with relation to said clamps beneath at least two clamps at successive stops of said conveyor members in timely relation to the opening of said clamps, means operating during the time the clamps are open for simultaneously moving said receptacles from a point immediately beneath said clamps to a lower position and back to the original position, wheels projecting into said receptacles and rotatable in different planes in adjacent receptacles, said wheels projecting only an amount sufficient to rotate said fruit when the convex surface of said fruit is presented to said wheels, and means for simultaneously rotating said wheels during the movement of said receptacles.

11. Means for orientating fruit having a stem indent, which comprises a pair of endless conveyor members movable in successive steps along a horizontal plane, cross bars connecting said members, a plurality of fruit clamps attached to said cross bars on the advancing edges thereof, each of said clamps comprising a pair of vertical arms horizontally movable to hold and release a fruit positioned therebetween, means operating to open and close said clamp arms at each stop of said conveyor members, fruit receiving receptacles vertically movable with relation to said clamps beneath at least two clamps at successive stops of said conveyor members in timely relation to the opening of said clamps, means operating during the time the clamps are open for simultaneously moving said receptacles from a point immediately beneath said clamps to a lower position and back to the original position, wheels projecting into said receptacles and rotatable in different planes in adjacent receptacles, said wheels projecting only an amount sufficient to rotate said fruit when the convex surface of said fruit is presented to said wheels, and means for continuously and simultaneously rotating said wheels.

12. In a device for orientating indented fruit, a member having a plurality of concave recesses therein having a spherical contour, each of said recesses having a slot therein, axles crossing each of said slots, wheels mounted on said axles and rotatable in said slots, said wheels projecting into the concavities of said recesses, and driving means simultaneously rotating all of said axles and wheels.

13. Assembly in accordance with claim 12, wherein a plurality of members are mounted in fixed relation to each other with recesses alined, and with the wheels in one member rotating in a plane at right angles to the plane of rotation of the wheels of the other member.

14. Assembly in accordance with claim 12, wherein a plurality of members are mounted in fixed relation to each other with recesses alined, and with the wheels in one member rotating in a plane at right angles to the plane of rotation of the wheels of the other member, and means for depositing in and removing fruit from, said recesses.

15. In a device for orientating indented fruit, a member having a plurality of concave recesses therein having a spherical contour, each of said recesses having a slot therein, axles crossing said slots, wheels mounted on said axles and rotatable in said slots, said wheels projecting into the concavities of said recesses, driving means simultaneously rotating all of said axles and wheels, and means for depositing in and removing fruit from, said recesses.

16. In a device for orientating indented fruit, a horizontal member having a plurality of upwardly opening concave recesses therein, fruit revolving members projecting a fixed distance into the concavities of said recesses, means for simultaneously driving all of said fruit revolving members, and means for depositing in and removing fruit from each of said recesses in succession for rotation therein.

17. Apparatus in accordance with claim 16, wherein said fruit revolving members are positioned to rotate said fruit in vertical planes.

18. Apparatus in accordance with claim 16, wherein said fruit revolving members are positioned to rotate said fruit in at least two different vertical planes in successive recesses.

19. Apparatus in accordance with claim 16 wherein said fruit revolving members are positioned to rotate said fruit in vertical planes and wherein each of said fruit revolving means projects into said recesses a distance insufficient to provide rotation of a fruit when the stem indent of said fruit registers with said fruit revolving means.

20. In a device for orientating indented fruit, a member having a plurality of concave recesses therein, fruit revolving members projecting a fixed distance into the concavities of said recesses, means for simultaneously driving all of said fruit revolving members, and means for depositing in and removing fruit from each of said recesses in succession, said fruit revolving means being incapable of rotating said fruit when the stem indent of said fruit registers with said fruit revolving means.

21. Means for orientating fruit having a stem indent comprising a fruit clamp having a pair of vertical arms horizontally movable to hold and release a fruit, means for initially closing said clamp with a fruit therein with a portion of said fruit extending below the lower edge of said arms, means for moving said loaded clamp over a horizontal path to a predetermined stopping point, a fruit receiving cup positioned beneath said clamp at that point in a position lower than the lowest portion of the held fruit, and means for vertically moving said cup to a point immediately below said clamp arms with the extending portion of said fruit entering the interior of said cup, and means for opening said clamp to deposit said fruit in said cup.

22. Apparatus in accordance with claim 21 wherein means are provided to rotate said fruit while in said cup while said clamp arms are open, together with means for closing said clamp arms after a fruit has been rotated.

23. In a device for orientating indented fruit, a member having a plurality of concave recesses therein, a mechanism having fruit revolving portions thereof projecting a fixed distance into said recess, said fruit revolving portions revolving fruit in said recesses by friction except when the fruit indents register with said portions, means for driving said mechanism to revolve fruit in said recesses, and means for depositing fruit in said recesses, for orientation therein.

24. A machine for positioning a generally spherical article having at least one face thereon capable of resting stably on a flat surface, said machine comprising a cup-like receptacle for supporting an article positioned therein, a member movably supported by said receptacle and extending across said receptacle adjacent the bottom thereof in a cooperative relation to said receptacle to engage an unstably supported article in said receptacle, and means for moving said member relative to said receptacle.

25. A machine as in claim 24, wherein the member is rotated cooperatively adjacent the bottom of said receptacle.

26. A machine as in claim 24, wherein the member is a wheel rotated cooperatively adjacent the bottom of said receptacle.

27. A machine for positioning a generally spherical fruit having at least one face thereon capable of resting stably on a flat surface, said machine comprising a cup-like receptacle for supporting an article positioned therein, and a fruit-driving member extending across said receptacle adjacent the bottom thereof in a cooperative relation to said receptacle to engage an unstably supported fruit in said receptacle, and means for moving said driving member relative to said receptacle.

28. Apparatus in accordance with claim 27, wherein said driving member is rotated.

29. Apparatus in accordance with claim 27, wherein said driving member comprises a rotatable wheel.

30. A machine for positioning a generally spherical article having at least one face having a stem indent thereon and capable of resting stably on a flat surface, said machine comprising a plurality of alined cup-like receptacles for supporting articles positioned therein, a member movably supported by said receptacles and having portions thereof extending across said receptacles adjacent the bottoms thereof in cooperative relation to said receptacles to engage unstably supported articles in said receptacles, and means for moving said member to move said portions relative to said receptacles.

ELLSWORTH W. CARROLL.